US010303942B2

(12) United States Patent
Chang et al.

(10) Patent No.: US 10,303,942 B2
(45) Date of Patent: May 28, 2019

(54) SHORT TERM CLOUD FORECAST, IMPROVED CLOUD RECOGNITION AND PREDICTION AND UNCERTAINTY INDEX ESTIMATION

(71) Applicant: Siemens Aktiengesellschaft, Munich (DE)

(72) Inventors: Ti-chiun Chang, West Windsor, NJ (US); Jan Ernst, Plainsboro, NJ (US); Jeremy-Ralph Wiles, Graefenberg (DE); Joachim Bamberger, Erlangen (DE); Andrei Szabo, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 15/434,122

(22) Filed: Feb. 16, 2017

(65) Prior Publication Data
US 2018/0232557 A1 Aug. 16, 2018

(51) Int. Cl.
*G01W 1/10* (2006.01)
*G06K 9/00* (2006.01)
(Continued)

(52) U.S. Cl.
CPC .............. *G06K 9/0063* (2013.01); *G01W 1/10* (2013.01); *G06F 17/18* (2013.01); *G06N 3/08* (2013.01);
(Continued)

(58) Field of Classification Search
CPC ....... G06K 9/0063; G01W 1/10; G06F 17/18; G06T 2207/20088
See application file for complete search history.

(56) References Cited

U.S. PATENT DOCUMENTS 9,778,627 B2 * 10/2017 Stoettrup ................. H02J 3/28
2010/0309330 A1 * 12/2010 Beck ........................ G01W 1/10
348/222.1
(Continued)

FOREIGN PATENT DOCUMENTS

KR   101709860 B1 *  2/2017
WO   WO-2011124720 A2 * 10/2011 .............. G01W 1/12

OTHER PUBLICATIONS

Chow et al. "Cloud Motion and Stability Estimation for Intra-hour Solar Forecasting"; www.sciencedirect.com; Apr. 3, 2015; 11 pages.
(Continued)

*Primary Examiner* — Jessica M Prince
*Assistant Examiner* — Michael Robert Cammarata

(57) ABSTRACT

A short-term cloud forecasting system includes a cloud segmentation processor that receives image data from images captured by an all sky camera. The cloud segmentation processor calculates a probability for each pixel in an image that the pixel is representative of a cloud. A cloud motion estimation processor calculates a motion vector representing estimated cloud motion calculates weights representing the likelihood that the cloud motion will cause a cloud to occlude the sun at a time in the near future. An uncertainty processor calculates one or more uncertainty indexes that quantify the confidence that a cloud forecast is accurate. Combining the cloud probabilities, the global motion vector and the at least one uncertainty index, in a sun occlusion prediction processor produces a short-term cloud forecast based on the image data that may be used as input to control systems for controlling a power grid.

16 Claims, 7 Drawing Sheets

(51) Int. Cl.
*G06T 7/11* (2017.01)
*G06F 17/18* (2006.01)
*G06T 7/143* (2017.01)
*G06T 7/215* (2017.01)
*G06T 7/246* (2017.01)
*G06N 3/08* (2006.01)
*H02S 40/20* (2014.01)

(52) U.S. Cl.
CPC ............... *G06T 7/11* (2017.01); *G06T 7/143* (2017.01); *G06T 7/215* (2017.01); *G06T 7/246* (2017.01); *G06T 2207/10016* (2013.01); *G06T 2207/10024* (2013.01); *G06T 2207/20081* (2013.01); *G06T 2207/20084* (2013.01); *G06T 2207/30192* (2013.01); *H02S 40/20* (2014.12)

(56) References Cited

U.S. PATENT DOCUMENTS

| | | | | |
|---|---|---|---|---|
| 2014/0320607 | A1* | 10/2014 | Hamann | H04N 5/23296 348/47 |
| 2015/0301226 | A1* | 10/2015 | Sun | G01W 1/12 702/3 |
| 2015/0302575 | A1* | 10/2015 | Sun | G01W 1/12 382/103 |
| 2017/0031056 | A1* | 2/2017 | Vega-Avila | G01W 1/12 |
| 2017/0124694 | A1* | 5/2017 | Ma | H04N 5/2254 |
| 2017/0228834 | A1* | 8/2017 | Hoff | G06Q 50/06 |

OTHER PUBLICATIONS

T.N. Palmer "Predicting Uncertainty in Forecasts of Weather and Climate" Research Department; Nov. 1999; 48 pages.

David Bernecker et al: "Continuous, short-term irradiance forecasts using sky,images" Solar Energy., vol. 110, Dec. 1, 2014 (Dec. 1, 2014), pp. 303-315, XP055312168.

Thomas Schmidt et al: "Evaluating the spatio-temporal performance of sky-imager-based solar irradiance analysis and forecasts" Atmospheric Chemistry and Physics, vol. 16, No. 5, Mar. 15, 2016 (Mar. 15, 2016) , pp. 3399-3412, XP055438653 / Mar. 15, 2016.

International Search Report dated Jan. 24, 2018; Application No. PCT/US2017/063276; Filing Date: Nov. 27, 2017; 18 pages.

Hao Huang et al. "Correlation and Local Feature Based Cloud Motion Estimation"; Aug. 12, 2012; Beijing, China; 9 pages (Originally Cited on Feb. 16, 2017).

Farnebäck, Gunnar. "Two-frame motion estimation based on polynomial expansion." Scandinavian conference on Image analysis. Springer, Berlin, Heidelberg, 2003. (Originally Cited on Feb. 16, 2017).

* cited by examiner

SHORT TERM CLOUD FORECAST, IMPROVED CLOUD RECOGNITION AND PREDICTION AND UNCERTAINTY INDEX ESTIMATION

TECHNICAL FIELD

This application is related to photovoltaic power generation. More particularly, the application relates to systems and methods for predicting cloud dynamics within a local area of a photovoltaic power station.

BACKGROUND

An important factor that determines the stability and efficiency of a photovoltaic power station is cloud occlusion of sunlight. Unfortunately, the cloud dynamics in a local area within a short time horizon, for example about 20 minutes, cannot be accurately predicted using conventional computational techniques. Work has been done with camera-based systems which provide potential for fulfilling cloud dynamics estimation. These systems capture images of the sky continuously over periodic intervals, for example, every few seconds. Through analysis of the time series of images a reasonable estimate of cloud trajectories may be obtained. Predictions of when and how much sunlight will be occluded in the near future may be made through the analysis.

The camera system is calibrated and the captured images are transformed into the physical space or their Cartesian coordinates, referred to as the sky space. The clouds captured in the images are segmented and their motion is estimated to predict the cloud occlusion of the sun. For cloud segmentation, algorithms based support vector machine (SVM) and random forest have been proposed. To perform motion estimation, Kalman filtering, correlation and variational optical flow methods have been described in the literature. Techniques for long term predictions have been proposed, however, short term uncertainty is not addressed. A relatively short term (e.g. intra-hour) forecast confidence has been proposed correlating point trajectories with forecast error, with longer trajectory length corresponding to smaller forecast error. But using trajectory length as a criterion requires that the estimate be made only after the trajectory is completed. Thus, estimates at each image sample cannot be obtained.

SUMMARY

Embodiments of the present invention address and overcome one or more of the above shortcomings and drawbacks, through methods, systems, and apparatuses for predicting cloud coverage using a ground-based all sky imaging camera. This technology is particularly well-suited for, but by no means limited to, solar energy applications.

According to aspects of an embodiment of the disclosure, a method for producing a short-term cloud forecast to predict cloud occlusion of the sun includes obtaining image data from a plurality of images of the sky captured by an image capture device. A cloud segmentation processor analyzes each pixel of an image of the plurality of images of the sky to compute a cloud probability that the pixel is a cloud pixel. A cloud motion estimation processor compares subsequent images of the sky to calculate a global motion vector for a given image the global motion vector indicative of a weighted pixel-wise motion field for the given image. An uncertainty processor calculates at least one uncertainty index representative of a confidence level of the short-term cloud forecast.

According to an aspect of an embodiment of the disclosure, computing a cloud probability that a pixel is a cloud pixel includes receiving the pixel-wise color of each pixel in an image, determining a distance between a pixel identified as a cloud and a pixel identified as a sun pixel, determining a distance between a pixel identified as a cloud and a pixel associated with the zenith of the sky in the image. According to another aspect of an embodiment of the disclosure, pixel-wise color of a pixel may be determined at least in part by a ratio of a red color channel to a blue color channel of the pixel. The ratio may be a simple ratio of a normalized ratio.

According to aspects of embodiments of the disclosure, a global motion vector for an image is calculated by obtaining a pixel-wise motion field for each pixel in the image and weighting each pixel in the motion field based on the likelihood that the pixel represents a cloud that will occlude the sun in the short-term sun forecast. Weighting each pixel may be performed according to an angle discrepancy between the estimated motion of a pixel and a vector from that pixel directed toward pixels representing the sun. In other aspects of embodiments of the disclosure, weighting of each pixel may be according to the pixel's distance from a sun pixel or from a pixel representative of a zenith in the sky. In other aspects of embodiments of the disclosure, weighting of each pixel may be according to an estimated motion of a cloud represented by the pixel.

According to an aspect of an embodiment of this disclosure, a system for producing short-term cloud forecasts includes a full sky camera in communication with a short-term cloud forecasting system. The short-term cloud forecasting system includes at least a cloud segmentation processor, a cloud motion estimation processor and an uncertainty processor. A neural network computes cloud pixel probabilities in the cloud segmentation processor. The system uses these processes to produce short-term cloud forecasts. The generated short-term cloud forecasts may provide inputs to a control system of a power grid.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Improved short-term cloud forecasts may be made through the use of neural networks that are trained using annotated sky images. The neural network computes cloud pixel probabilities enabling cloud segmentation. Cloud segmentation along with cloud estimation motion and quantified uncertainties involving future estimates (e.g. forecasts) are used to create accurate and reliable future forecasts.

Figure 1:
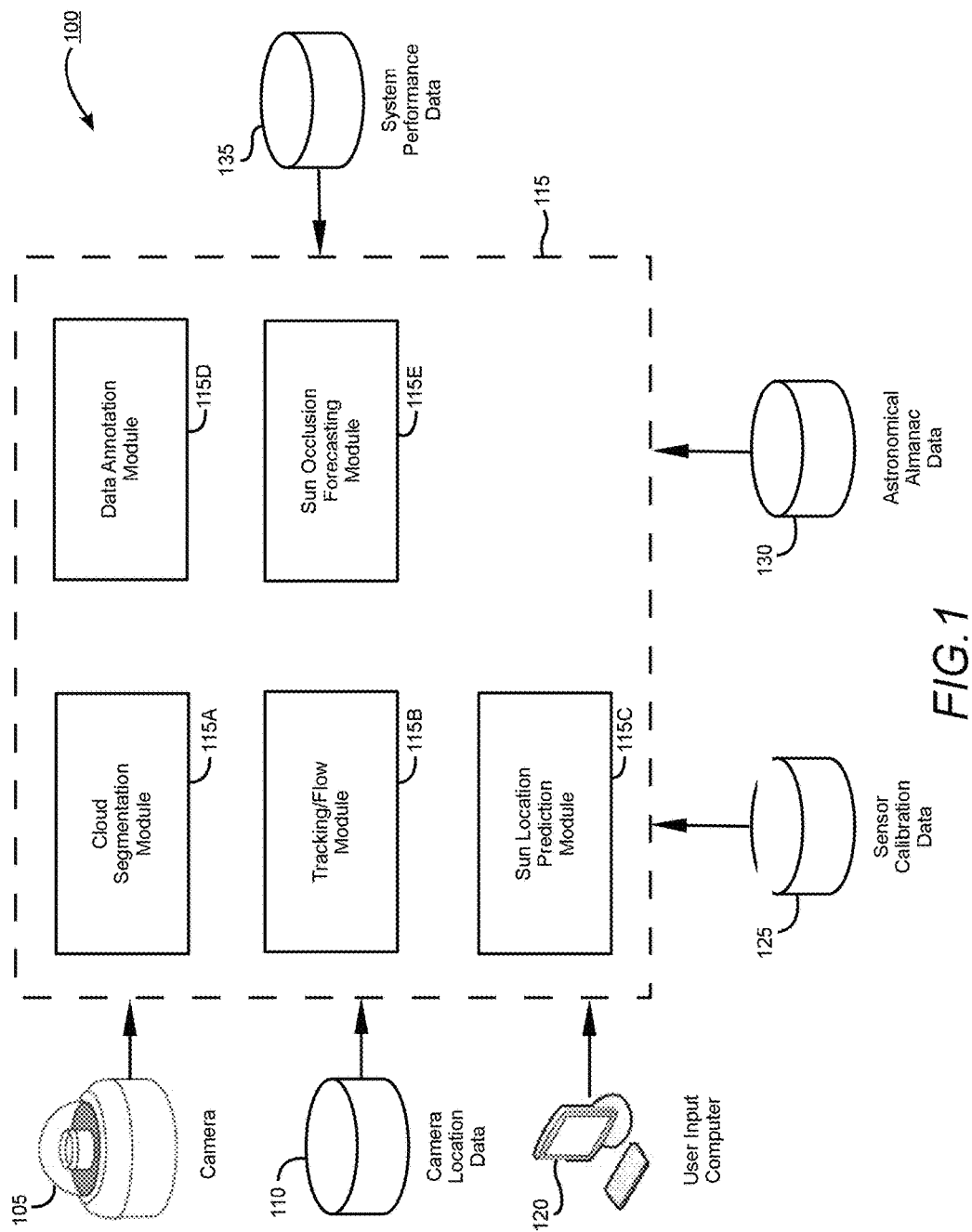
FIG. 1 is a block diagram of a system for forecasting cloud occlusion for a photovoltaic power station.

FIG. 1 provides an overview of a system 100 for predicting cloud coverage of a future sun position, according to certain embodiments of the present disclosure. The system includes a data processing system 115 that receives input from a variety of sources, including a camera 105. The camera 105 may be used to capture sky images at predetermined intervals (e.g., 5 seconds). Prior to use, the camera may be calibrated using specialized software, Camera Location Data 110, and Sensor Calibration Data 125 to yield a camera intrinsic matrix and fisheye camera model. The images captured by the camera 105 may then be projected from image space to sky space. The parameters needed for this projection are available after the calibration of the camera is complete.

The system 100 may utilize a trained cloud segmentation model to identify clouds in image data. To construct the training data utilized by the model, a predetermined number of cloud and sky pixels (e.g., 10,000 of each) are randomly sampled from annotated images. The system 100 includes a User Input Computer 120 which allows users to view sky images and select pixels as "cloud" or a "sky" (i.e., non-cloud). This selection can be performed, for example, by the user selecting individual portions of the image and providing an indication whether the selected portions depict a cloud. The data supplied by the User Input Computer 120 is received and processed by a Data Annotation Module 115D which aggregates the user's annotation data and supplies it to a Cloud Segmentation Module 115A. The Cloud Segmentation Module 115A then constructs a binary classifier which can classify new pixels at runtime as cloud or sky based on the training model.

The features used by the Cloud Segmentation Module 115A to represent sky and cloud pixels may include, for example, color spectrum values and a ratio of red and blue color channels. With respect to color spectrum values, in one embodiment the Hue (H), Saturation (S) and Value (V) color space is used. It can be observed that sky and cloud pixel values lie in different spectrums in H. Similarly sky pixels have more saturation compared to cloud pixels. V may be used to represent brightness. With respect to the ratio of red and blue color channels, it is understood in the art that the clear sky scatters blue intensities more whereas cloud scatters blue and red intensities equally. Hence, a ratio of blue and red color intensities in the images can be used to distinguish between sky and cloud pixels. In one embodiment, a simple ratio of red (r) and blue channel (b) is used:

$$RBR = \frac{b}{r} \quad (1)$$

In other embodiments, a normalized ratio of red and blue channel is used:

$$RBRn = \frac{b-r}{b+r} \quad (2)$$

In yet another embodiment, a different normalized ratio of channels given by ratio of red channel to the maximum of red and blue channel.

$$RBRn2 = \frac{r}{\max(r, b)} \quad (3)$$

In another embodiment, a difference between the value of red channel and blue channel is employed.

$$RBRdiff = (r-b) \quad (4)$$

The features used by the Cloud Segmentation Module 115A to represent sky and cloud pixels may also include variance values and/or entropy values. Variance provides the measure of spread of the pixels values. In one embodiment, for each pixel in the cloud or sky region, the variance in the N×N neighborhood is computed. For fast computation of variance, integral images or sum image may be used as well as square of intensities image. Entropy provides the textural information about the image. Similar to the valiance, for each pixel in the cloud or sky region, the entropy in the N×N neighborhood may be defined as follows:

$$\text{Entropy} = -\sum_{i \in (0,255)} p_i \log(p_i) \quad (5)$$

where $p_i$ is calculated using histogram of image intensities.

Utilizing the cloud velocity, the future cloud position may be forward-propagated by using the velocity components. For example, if the current time is t0 and a prediction of cloud coverage is desired at t0+dt, the cloud location at time t0 may first be determined. Then, the cloud is propagated to t0+dt based on the cloud velocities calculated at t0. In some embodiments, to simplify processing, the wind speed is assumed to be constant and local cloud evolution is not considered during the prediction period.

Returning again to FIG. 1, at runtime a Sun Location Prediction Module 115C predicts the location of the sun at a current time. In the example of FIG. 1, sun location is predicted based on Astronomical Almanac Data 130. However, in other embodiments, different techniques may be used for predicting sun position such as, by way of non-limiting example, mathematical modeling based on known geophysical constants. Cloud Segmentation module 115A uses the aforementioned classifier to determine whether pixel location in the images include clouds. The camera 105 captures multiple sky images which are used by a Tracking/Flow Module 115B to calculate a cloud velocity field for the sky. Then, a Sun Occlusion Forecasting Module 115E utilizes the current location of the clouds and the velocity field to determine cloud coverage of the future time. More specifically, a group of pixels depicting the current location of the sun are designated as the "sun pixel locations." Utilizing the velocity field, the Sun Occlusion Forecasting Module 115E forward-propagates the cloud pixel locations using the velocity components. For example, if the current time is t0 and a prediction of cloud coverage is desired at t0+dt, the cloud location at time t0 may first be determined. Next, the cloud pixels corresponding to that location are propagated to t0+dt based on the velocity calculated at t0. In some embodiments, to simplify processing, the wind speed is assumed to be constant and local cloud evolution is not considered during the prediction period. If the predicted future cloud pixels correspond to identified sun pixels, the sun is considered occluded. Following each classification, or on other intervals, system performance data 135 may be outputted which may be used, for example, for system benchmarking.

According to a method of cloud segmentation according to embodiments of the invention, a neural network is employed that performs non-linear classification using features including pixel-wise color, distance to the sun, distance to zenith, and the estimated motion flow. These features may be jointly optimized at the network training phase and processed by the neural network to perform cloud segmentation using color, distance from the sun and zenith, and estimated cloud motion flow to more accurately identify cloud pixels and sky pixels. This is in contrast to linear SVM which requires separate refining by location, time and context after classifier training. According to aspects of embodiments of the disclosure, once the neural network (i.e. the synaptic weights) is trained, for any new data set, only forward evaluation is needed and is computationally efficient.

Motion estimation is concerned with the non-homogeneous motion field of clouds within sequential images. The motion of clouds is frequently non-homogeneous due to atmospheric flow typically being irregular as opposed to uni-directional. According to aspects of this disclosure, efficiency and more accurate estimates are achieved when only cloud movement having a potential for occluding the sun is considered. Other movements associated with clouds that do not have a potential for occluding the sun within an upcoming timeframe are disregarded. Considering only the cloud movement with a potential for sun occlusion a global motion vector (M_x, M_y) is considered. Forward extrapolation in time is used to then compute occlusion probabilities. Using only one motion vector provides the advantage that estimation errors are averaged over individual pixels and cloud deformation that is not representative of true motion is suppressed. This results in a more stable estimate.

A motion estimation algorithm is used to define a pixel-wise motion field (F_x(x,y), F_y(x,y)). A global motion vector (M_x, M_y) is then computed from the motion field, the motion field being weighted by: (1) a cloud probability P(x,y); (2) an angle discrepancy between a vector pointing to the sun and the estimated motion; and (3) a distance d(x,y) to the sun (s_x, s_y), which may be expressed as:

$$M\_x = \Sigma\{W(x,y).*F\_x(x,y)/\Sigma(W(x,y))\};$$

$$M\_y = \Sigma\{W(x,y).*F\_y(x,y)/\Sigma(W(x,y))\}; \quad (6)$$

where the weight W(x,y) is according to:

$$W(x,y) = h(P(x,y).*f(d(x,y)).*g(([F\_x(x,y)F\_y(x,y)][x-s\_x\ y-s\_y]'))) \quad (7)$$

and h, f, and g are functions of choice, for instance, exponential or polynomial functions.

Angle discrepancy allows for the identification of cloud pixels which are most likely to undergo motion resulting in the cloud occluding the sun in the near future. In making this determination, the location of the cloud pixel with relation to pixels in the image associated with the sun is considered. Pixels identified as clouds, but determined to have a low probability of future occlusion of the sun may be disregarded. This allows processing to concentrate only on the clouds most likely to have an effect on the amount of sun occlusion in the near-future forecast, making processing of real-time or ground true images faster and more efficient.

Figure 2:
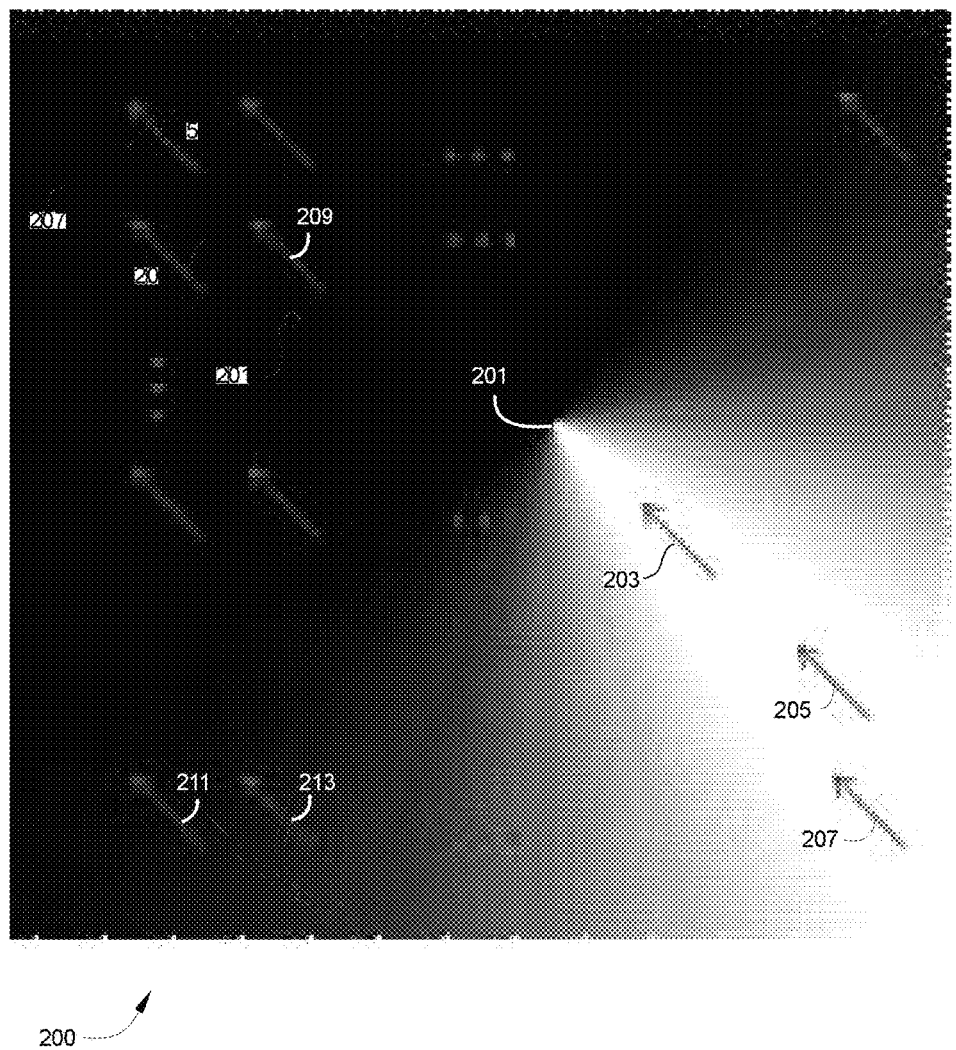
FIG. 2 is a visual representation of angle discrepancy for estimating motion of clouds according to aspects of embodiments of the disclosure.

The concept of weighting based on angle discrepancy is illustrated in FIG. 2 which shows an illustration of a sky image 200 indicating sun location along with estimated motion vectors within the sky image 200. The sun is captured in sky image 200 and identified by one or more pixels 201, referred to as sun pixels. Individual pixels in the image are identified and an estimated motion of each individual pixel is computed a portion of which are depicted by arrows in FIG. 2. The global motion vector is calculated based on the computed estimated motion for all pixels in the image. To determine the global motion vector, the estimated motion of each individual pixel is weighted according to factors including an angle discrepancy between the estimated motion and the relative location of the sun pixels 201. The weighting of estimated motion for each pixel is represented in FIG. 2 by the color gradient with darker areas having a lower weighting value and lighter areas assigned a higher weighting value.

By way of example, estimated motion vector 203 receives a higher weighting value based on the estimated motion vector's 203 proximity to the sun pixels 201. In addition, estimated motion vector 203 receives additional weighting due to its relative direction toward sun pixels 201. Estimated motion vector 205, while receiving a relatively high weight due its projected direction toward the sun pixels 201, is less weighted than estimated motion vector 203 because estimated motion vector 205 is farther from the sun pixels 201 than estimated motion vector 203. Estimated motion vector 207, is less weighted than either estimated motion vector 203 and 205. While estimated motion vector 207 is roughly equidistant from sun pixels 201 with respect to estimated motion vector 205, estimated motion vector 207 is projected in a direction which is not in line with sun pixels 201, causing the weight value assigned to vector 207 to be lower than that of vector 205.

Similarly, estimated motion vectors 211 and 213 are assigned lower weights than motion vectors 203, 205 and 207 due to their projected direction which is not directly in line with sun pixels 201.

To illustrate the concept of angle discrepancy, assume that the cloud motion is homogeneous and moving from the bottom right to the upper left (i.e. at 135° as shown by the arrows in FIG. 2. The sun is located at the brightest spot 201. According to the angle discrepancy equation, those pixels that are pointing toward the sun and have angles closer to 135° are given higher weighting, as indicated by the intensity map shown in FIG. 3B. Conversely, those pixels that form −45° with the sun 201 would receive the lowest weighting.

Figure 3B:
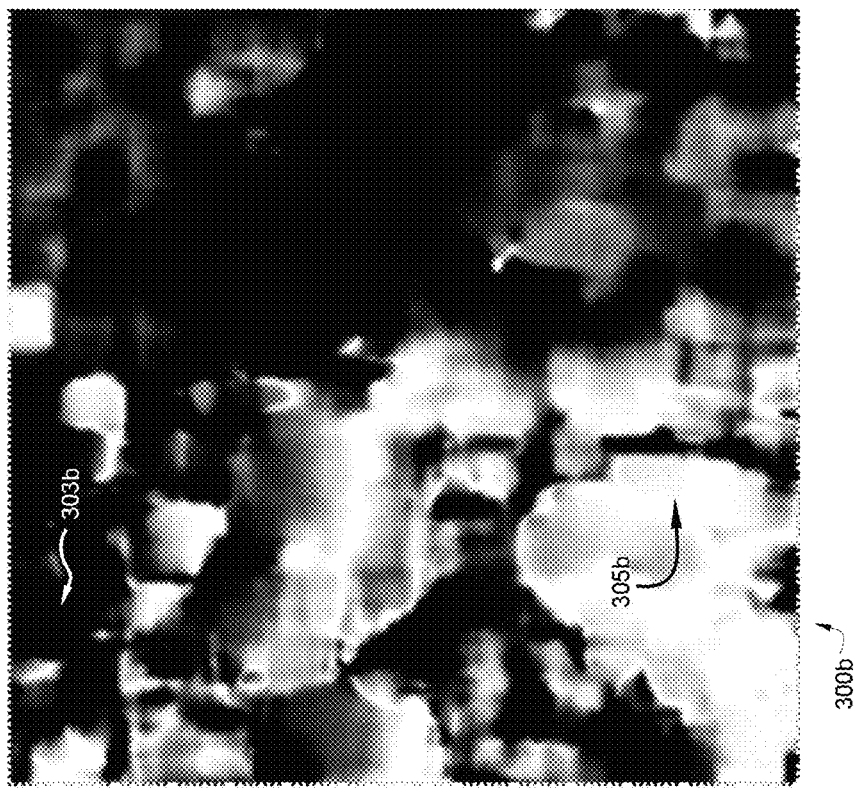
FIG. 3B is a visual representation of a weighting scheme for cloud motion prediction according to aspects of embodiments of the disclosure.
Figure 3A:
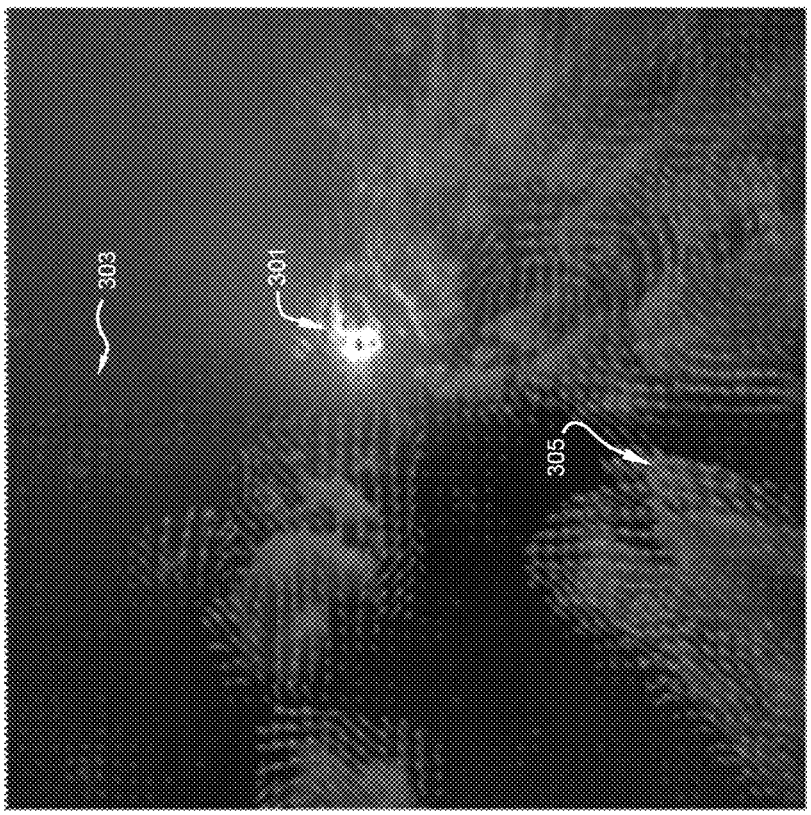
FIG. 3A is a visual representation of a cloud motion field according to aspects of embodiments of the disclosure.

Referring to FIG. 3A, an exemplary image 300 depicting a cloud image with estimated motion overlay is shown. Pixels associated with images of the sun are denoted 301. Areas of the image where clouds are sparse, or cloud motion detected between subsequent images is small are indicated by smaller motion vectors 303. Meanwhile, areas of the image where the detected cloud movement is more pronounced, the associated motion vectors are indicated by longer arrows 305.

FIG. 3B is an image 300b illustrating the weighting corresponding to the estimated motion shown in FIG. 3A. Image 300b represents the weighting determined according to the intensity of movement of clouds, as well as the location and direction (e.g., angle discrepancy) of clouds as described with reference to FIG. 2. Pixels representing areas of clouds movement with a higher likelihood of occluding the sun in the future are indicated by lighter areas 305b. Pixels representing areas of cloud movement with a lower likelihood of occluding the sun are indicated as darker areas 303b.

The effect of this processing is that the prediction approach focuses on clouds that are more likely to cover the sun in the near future. As a result, aspects of this disclosure produce an improved "region of interest". Therefore, chaotic movements of clouds in areas of no interest do not disturb the overall cloud movement prediction.

In addition to cloud segmentation and motion estimation, short-term cloud predictions may be further improved through quantification of the uncertainties associated with a given estimate. Uncertainty may be quantified through the calculation of uncertainty indexes, which capture the nature of various factors that introduce uncertainty as to the accuracy of a short-term cloud prediction. The quantification of uncertainty through the use of uncertainty indexes, will now be described in greater detail.

For uncertainty index (UI) estimation, a number of different measures may be utilized to correlate forecast confidence. A first uncertainty index (UI1) quantifies past forecast error, characterized by the mean and the standard deviation for prediction errors associated with predictions made at time instances in the past. The computation of UI1 is illustrated by the diagram of FIG. 4.

Figure 4:
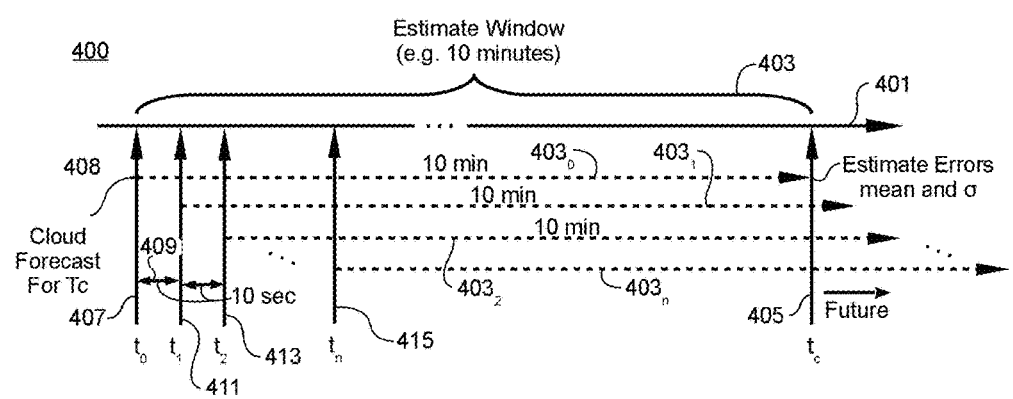
FIG. 4 is a diagram illustrating the computation of an uncertainty index according to aspects of an embodiment of the disclosure.

FIG. 4 depicts a timeline 400 where time is shown horizontally as line 401. A cloud forecast includes an estimated forecast of cloud coverage at a time in the near future. In the example shown in FIG. 4 this estimate window is considered to be 10 minutes 403. While a 10 minute interval is shown in FIG. 4, this is provided merely for the purposes of discussion. Other time intervals may be used that are longer or shorter than the 10 minute estimate windows shown in FIG. 4. Time intervals may be selected that provide either more or less current information based on detected cloud position and movement, while providing adequate lead time for adjustments to the smart grid system to respond to future fluctuations in energy supply due to cloud occlusion of photo-voltaic energy sources.

With reference to timeline 400, the current time $t_c$ is shown at 405. Times in the future are shown to the right of line $t_c$ 405 while times in the past are shown to the left of $t_c$ 405. Predictions of future cloud coverage are estimated at times $t_0$ 407, $t_1$ 411, $t_2$ 413, and $t_n$ 415. The time interval 409 between estimates $t_0$ and $t_1$ and the time interval between estimates $t_1$ and $t_2$ may be selected to be 10 seconds by way of example. These intervals 409 may correspond to the time between sky images captured by the sky imaging system.

With reference to FIG. 4, the prediction at $t_0$ 407 represents a cloud estimate for current time $t_c$ 405. At time $t_0$ 407, a prediction is made based on a 10 minute estimate window $403_0$. Estimate window $403_0$ ends at current time $t_c$ 405. Until the estimate window $403_0$ elapses, the accuracy of the estimate made at time $t_0$ cannot be determined as the prediction errors are not yet known. Predictions at times $t_1$, $t_2$ and $t_n$ correspond to estimate windows $403_1$, $403_2$, and $403_n$ respectively, which expire at future times occurring after current time $t_c$ 405.

As the estimate windows $403_0$, $403_1$, $403_2$, and $403_n$ expire, the prediction errors may be determined by comparing the predicted cloud coverage with the ground true (e.g., actual) cloud coverage. When the prediction errors are determined, the mean and standard deviation of the prediction errors may be calculated and used to provide an uncertainty index for future estimates.

A second uncertainty index (UI2) aims to characterize chaotic cloud dynamics that occur when clouds suddenly pop up or disappear in the middle of the sky as opposed to flowing from or moving away a predetermined path in subsequent images. UI2 is calculated using the cloud segmentation map and tracking individual clouds based on a proximity criterion. The idea behind this index is that when the cloud formation is chaotic, the less confidence should be placed in the prediction. In fact, it has been observed that chaotic cloud motion is a leading cause for large forecast errors in conventional techniques. Additionally, weighting schemes, such as those described above with respect to motion estimation may be applied to emphasize those popup or disappearing clouds that have little angle discrepancy and proximity to the sun. The effect is that cloud scenarios where chaotic movement and cloud pop-ups are likely to occur may be accounted for in the final prediction.

The third uncertainty index (IU3) and fourth uncertainty index (UI4) are computations of average cloud probabilities over predefined areas. For UI3, concentric annuli that centered at the sun are constructed in the image. Each annulus may be drawn to have a width r_i and the radius $\Sigma r\_i$, i= 1, . . . , n. The number of pixels within each annulus may be counted to provide an average cloud probability for the region of the image defined by the annulus.

UI4 may be simply defined as the average cloud probability over the entire image. The idea is that when there are more clouds (up to a certain extent) in the sky, it is likely to either introduce cloud dynamics or prediction uncertainty. Optionally, the weighting scheme described above with respect to motion estimation can be applied to either UI3 or UI4.

Finally, a fifth uncertainty index (UI5) may be defined as the cloud average speed. Average cloud speed is readily available from the motion estimation results, and may include either (or both) weighted and un-weighted versions. In experiments, UI5 displays a good correlation with forecast errors.

According to aspects of the current disclosure, short-term cloud prediction results have increased accuracy and robustness due to a segmentation processor using a neural network trained using annotated images, cloud motion estimation using a weighted motion vector map and uncertainty indexes to quantify the confidence in forecasts.

A weighting scheme based on angle discrepancy and distance from the sun, takes into consideration chaotic cloud dynamics and decouples them from what is really relevant to the objective of determining future sun occlusion by clouds. Cloud movement prediction and sun occlusion prediction are improved, because processing is constrained to only the region of interest. Disturbances and movements in other regions are suppressed.

By defining uncertainty indexes, violation events for possible use cases are minimized while maximizing the PV energy outputs. Through intelligent weighting and processing, including the consideration of uncertainty indexes, the performance of a target application (e.g. off-grid power systems, or renewable firming) may be improved. As a result, the detection sensitivity or ratio between undetected events and excessive false alarms can be tuned.

Figure 5:
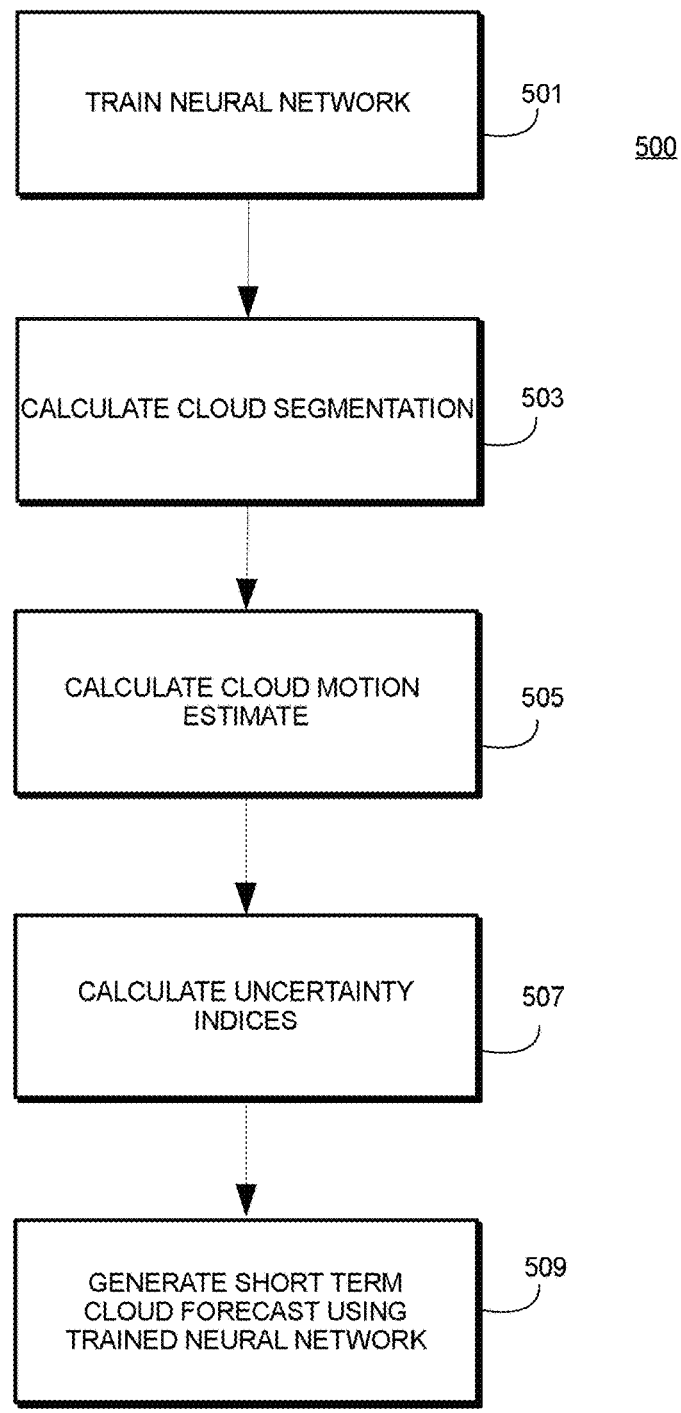
FIG. 5 is a process flow for predicting short-term cloud forecasts according to aspects of an embodiment of the disclosure.

FIG. 5 is a process flow diagram for a method of producing short-term cloud forecasts 500 according to aspects of embodiments of the disclosure. At step 501, a neural network is trained using weights derived from non-linear characteristics of the sky images. For example, pixel color, intensity, distance from an identified set of sun pixels, and/or distance from a zenith of the sky image may be used to weight nodes of the neural network. At step 503, the neural network calculates cloud segmentation to identify pixels in an image as being either cloud or sky. Identification of each pixel may be performed by analyzing a pixel's color, intensity, motion detected between subsequent images, distance of the pixel to pixels associated with the sun, and distance to the zenith in the sky. These features are jointly optimized and provide synaptic weights which may be used in the neural network. At step 505, cloud motion estimation is performed on a series of images captured depicting a portion of the sky. Motion estimation is performed to account for non-homogeneous motion of detected cloud pixels. Motion detection includes the calculation of a global motion vector, based on pixel-wise motion estimates which take into consideration, estimated motion with respect to the motion vector direction relative to the sun (e.g., angle discrepancy), distance from the sun, and position relative to the sun. The pixel-wise motion estimates may be weighted according to their likelihood to result in sun occlusion in a short-term time frame. At step 507, uncertainty indexes are calculated that are representative of a confidence level for a short-term cloud forecast. Uncertainty indexes may be calculated based on observed forecast errors. When the time window for a forecast elapses, the predicted cloud positions may be compared to the ground true image to identify prediction errors. The prediction errors may be averaged, and/or the standard deviation of the prediction errors may be used to define one uncertainty index.

Yet another uncertainty index may be derived based on chaotic cloud dynamics to identify clouds that randomly pop up or disappear in the middle of the sky as opposed to flowing along an identifiable path in the sky image. A cloud segmentation map of subsequent sky images and tracking individual clouds based on proximity criteria may be used to calculate this uncertainty index. Further, weighting may be used to identify transient cloud formations that occur with little angle discrepancy and proximity to the sun, and emphasize such formations in future forecasts.

Other uncertainty indexes may be defined based on cloud probabilities for pixels falling within certain regions in the sky image. For example, annular rings may be defined around pixels in the image representative of the sun. Within each annular ring, each pixel is evaluated for the probability that the pixel represents a cloud. The average probability for all pixels located within the annular ring may be used as an uncertainty index. The cloud probability calculated for each annular ring may be weighted according to the proximity of the annular ring to the sun pixels such that closer rings are deemed more likely to cause occlusion of the sun in the short-term forecast than areas associated with annular rings farther from the sun pixels. Other uncertainty indexes may be defined based on the average cloud probability for the entire sky image. In addition to the above, an uncertainty index may be derived based on observed cloud velocity, which may be extracted from motion estimation data. The cloud velocity may be averaged and optionally, the cloud velocity components may be weighted.

The non-linear cloud segmentation, improved cloud motion estimation and quantification of uncertainty indexes produces a short-term cloud forecast based on the prevailing conditions and past cloud dynamics to produce an optimized short-term cloud forecast at step 507.

Figure 6:
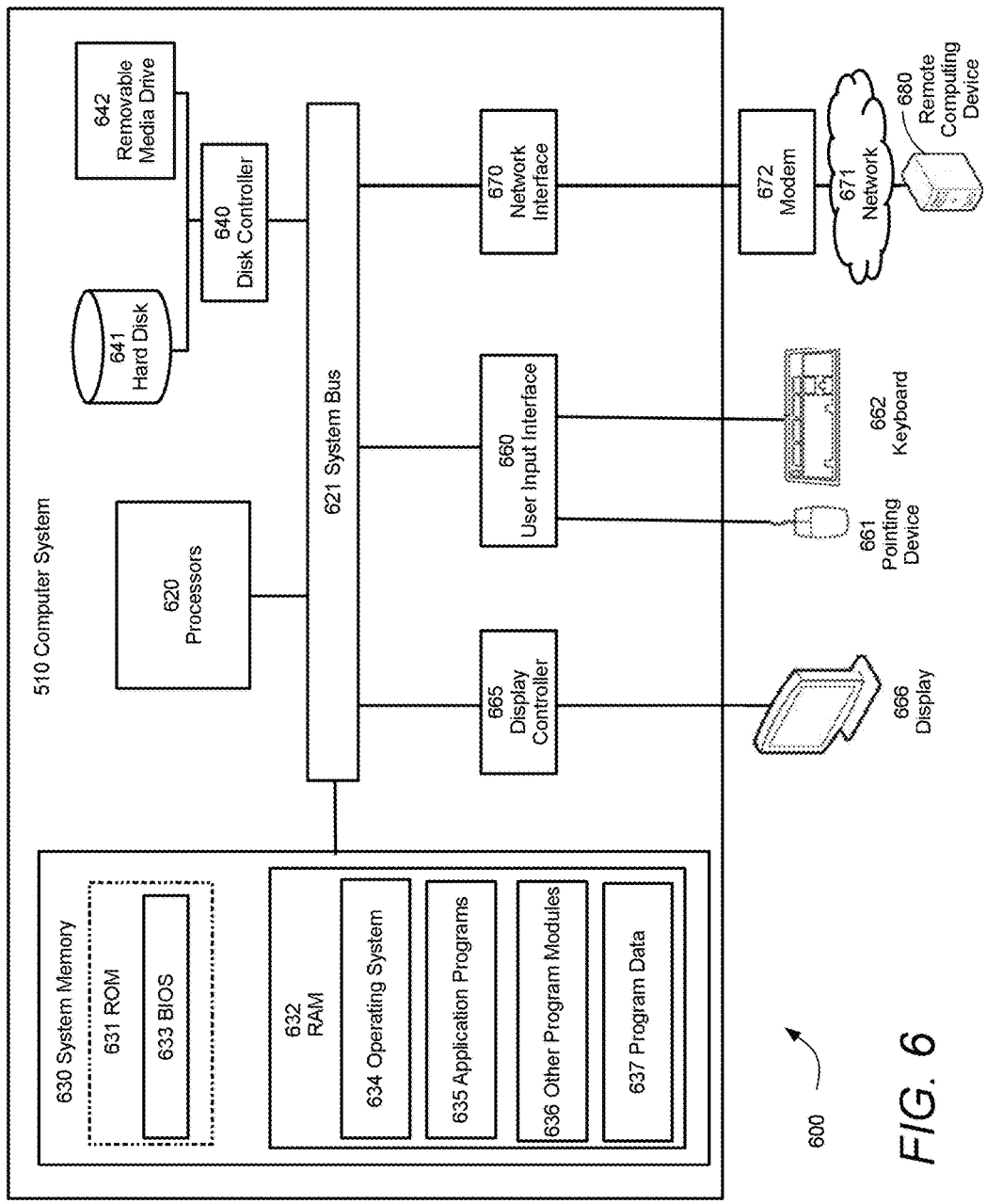
FIG. 6 is a block diagram of a system configured for performing computer based methods according to aspects of embodiments of the disclosure.

FIG. 6 illustrates an exemplary computing environment 600 within which embodiments of the invention may be implemented. For example, computing environment 600 may be used to implement one or more components of system 100 shown in FIG. 1. Computers and computing environments, such as computer system 610 and computing environment 600, are known to those of skill in the art and thus are described briefly here.

As shown in FIG. 6, the computer system 610 may include a communication mechanism such as a system bus 621 or other communication mechanism for communicating information within the computer system 610. The computer system 610 further includes one or more processors 620 coupled with the system bus 621 for processing the information.

The processors 620 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 6, the computer system 610 also includes a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the system bus 621 to control one or more storage devices for storing information and instructions, such as a magnetic hard disk 641 and a removable media drive 642 (e.g., floppy disk drive, compact disc drive, tape drive, and/or solid state drive). Storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the system bus 621 to control a display or monitor 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processors 620. The pointing device 661, for example, may be a mouse, a light pen, a trackball, or a pointing stick for communicating direction information and command selections to the processors 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a magnetic hard disk 641 or a removable media drive 642. The magnetic hard disk 641 may contain one or more data stores and data files used by embodiments of the present invention. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

The computing environment 600 may further include the computer system 610 operating in a networked environment using logical connections to one or more remote computers, such as remote computing device 680. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

Figure 7:
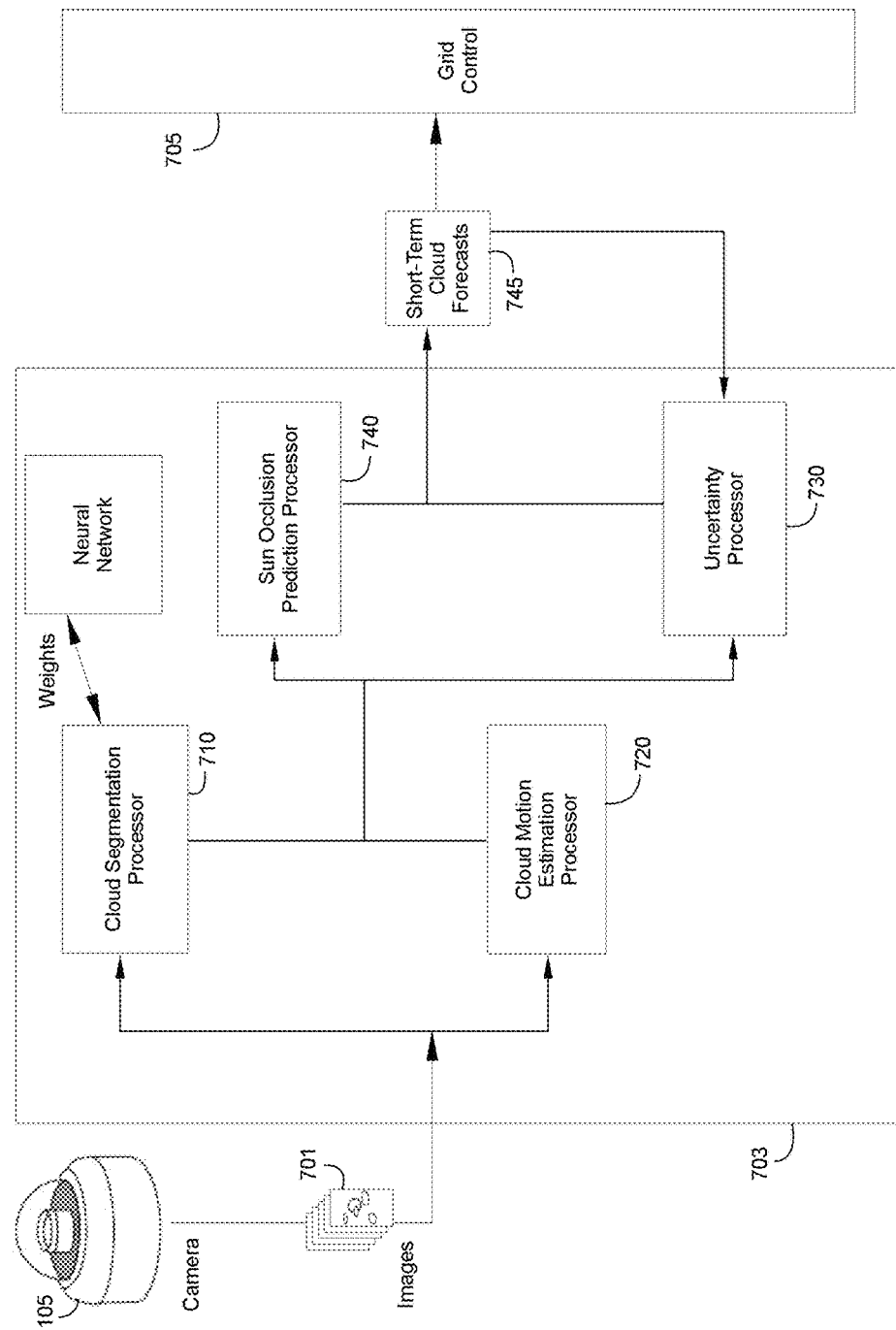
FIG. 7 is a block diagram of a short-term cloud forecasting system according to aspects of the disclosure.

Referring now to FIG. 7, a short-term cloud forecasting and grid control system is shown. A full sky camera 105 is positioned to capture a series of images of the sky 701. An all sky camera 105 is positioned with a view of the sky. Camera 105 is configured to capture images of the sky. Images captured by camera 105 may include images of the sun, and may further include images of one or more clouds. Camera 105 is positioned such that images captured by camera 105 contain only sky, including the sun and clouds, and is positioned to minimize or eliminate ground based fixed objects such as buildings, trees and the like from being included in the images. Camera 105 may be configured to capture images of the sky at a predetermined interval. In this way, camera 105 may be configured to generate a number of sequential sky images 701. Sequential images may be analyzed to detect cloud movement as pixels associated with clouds move between subsequent images. The images 701 are provided and received by a cloud segmentation processor 710 and cloud estimation processor 720.

Images 701 are communicated from camera 105 to a short-term cloud forecasting system 703 for processing of image data contained in the images 701. Short-term cloud forecasting system 703 may be configured as a computer system, such as that described above with respect to FIG. 6. Short-term cloud forecasting system 703, by way of example, may include one or more computer processors in communication with a computer memory. The computer memory stores computer readable instructions which when executed by the one or more processors, form special purpose devices, which are configured to receive images 701 from camera 105, and to perform specialized processing on the data contained in images 701 to produce short-term cloud forecasts 745 for control of a smart grid. The one or more processors may be configured to perform one of a number of processes relating to the forecasting of short-term cloud coverage for a portion of sky. When performing the processes, the one or more processors become specialized devices connected to and in communication with camera 105. The devices receive image data and produce outputs which define short-term cloud forecasts which provide input data to controllers of a power grid control 705.

Short-term cloud forecasting system 703 includes a cloud segmentation processor 710. Cloud segmentation processor 710 receives image data from images 701 captured by camera 105. Cloud segmentation processor 710 processes each pixel in each image of images 701 to determine a probability that the pixel represents a cloud or whether the pixel represents sky or other fixed background object. Cloud segmentation processor 710 may receive image data from images 701 and determine certain properties of the captured image pixels, including but not limited to, pixel color, pixel intensity, predicted motion, or distance from pixels associated with the sun, or distance of a pixel from the zenith of the sky. Cloud segmentation processor 710 produces outputs in the form of probabilities that a pixel represents a cloud. Short-term cloud forecasting system 703 further includes a cloud motion estimation processor 720. Cloud motion estimation processor 720 receives data image from images 701 captured by camera 105. Cloud motion estimation processor 720 processes the image data to produce outputs in the form of estimation motion vectors. Cloud motion estimation processor 720 may be configured to determine the likelihood that a detected cloud will occlude the sun in the short-term future. Likelihood that a cloud will move to occlude the sun in a short-term cloud forecast may be determined by considering the angle discrepancy of estimated motion with respect to a vector directed toward the sun. Further considerations, including but not limited to, the pixel's distance from the sun, position relative to a global motion vector at the pixel and the sun, motion velocity and direction may be used to estimate a future position of each cloud pixel in sky images 701.

Short-term cloud forecast system 703 further includes an uncertainty processor 730 configured to receive cloud segmentation and cloud motion estimation information from cloud segmentation processor 710 and cloud motion estimation processor 720. The images 701 include image data relating to cloud formations and estimated motion of clouds captured by camera 105 in images 701. Uncertainty processor 730 quantifies the degree of uncertainty affecting short-term forecasts generated by sun occlusion predication processor 740 and uncertainty processor 730. Uncertainty processor 730 is configured to receive data along with prior short-term cloud forecasts to calculate one or more uncertainty indexes. The one or more uncertainty indexes quantify the degree of uncertainty in short-term cloud forecasts and may be utilized for creating short-term cloud forecasts 745 based on the accuracy of past forecasts and confidence in current forecasts based on the data received from images 701. For example, uncertainty processor 730 may compare ground true (e.g. current) cloud positions at a current time $t_c$ to a previously generated forecast for time $t_c$. The difference between the forecasted cloud coverage and the actual ground true cloud coverage identifies forecast errors. The forecast errors may be averaged, or the standard deviation of the forecast errors may be used to calculate an uncertainty index based on past performance. Additionally, uncertainty processor 730 may calculate uncertainty indexes based on an average ratio of cloud pixels to the total number of pixels in a predetermined area of a sky image. The predetermined area or region of the sky image may be defined as the entire image, or may be defined as a portion of the image. For example, concentric rings around the pixels identified as sun pixels. Each ring may be defined having a predetermined thickness with the ring being comprised of a number of pixels of the image. A ratio of cloud pixels to the total number of pixels in each ring may be calculated and used to generate an uncertainty index based on the relative number of cloud pixels in the ring along with the ring's proximity to the sun pixels. Other measures of uncertainty may be derived from the image data in images 701 including, characterizing chaotic cloud movements assigning less confidence to cloud movement which is chaotic, with clouds quickly appearing and disappearing instead of following a longer path across the sky and cloud average speed. Cloud speed may be based on either weighted or unweighted models.

Data from the cloud segmentation processor 710 and the cloud motion estimation processor 720 is further used by sun occlusion prediction processor 740 to determine the likelihood that a cloud pixel identified in an image will move over the time interval of interest to a pixel position that corresponds to the sun position. When a predicted cloud pixel position corresponds to a sun pixel, it is an indication that that cloud will result in sun occlusion at the forecasted time. The outputs of the sun occlusion prediction processor 740 and the uncertainty processor 730 are combined to produce short-term cloud forecasts 745.

The short-term cloud forecasts provide information for near future energy needs based on the amount of solar energy which may be lost due to cloud occlusion. The information obtained from the cloud forecasts 745 may be used to provide control information to a grid control system 705, which controls the demand profile of a power grid. The power grid may be connected to many sources of energy generation and/or storage. At times when the short-term cloud forecasts 745 indicate that solar power may not be available due to the expected cloud coverage, other sources of energy may be increased or loads shifted to account for the shortfall in PV energy.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A method of producing a short-term, intra-hour cloud forecast to predict cloud occlusion of the sun comprising:
   in a cloud forecasting system, obtaining image data from a plurality of images of the sky captured by an image capture device;
   in a cloud segmentation processor, for each pixel in each image of the plurality of images of the sky, computing a cloud probability that the pixel is a cloud pixel;
   in a cloud motion estimation processor, comparing subsequent images of the plurality of images of the sky to calculate a global motion vector for a given image, the global motion vector indicative of a weighted pixel-wise motion field for the given image, wherein calculating of a global motion vector comprises:
      obtaining a pixel-wise motion estimation field (F_x(x,y), F_y(x,y)) for each pixel at coordinate (x,y) of the image with F_x being the vector coordinate in a x direction and F_y being a vector coordinate in a y direction;
      weighting each pixel in the motion estimation field based on a likelihood that the pixel will represent a cloud which will occlude the sun in the short-term cloud forecast by measuring an angle discrepancy between an estimated motion of the pixel and a vector directed toward pixels in the sky images representing the sun and assigning a larger weight to pixels having an estimated motion with a smaller angle discrepancy to the sun and assigning a smaller weight to pixels having an estimated motion with a larger angle discrepancy relative to the sun;
   in an uncertainty processor, calculating at least one uncertainty index representative of a confidence level of the short-term cloud forecast; and
   combining the cloud probabilities, the global motion vector and the at least one uncertainty index, in a sun occlusion prediction processor to produce the short-term cloud forecast based on the image data.

2. The method of claim 1, wherein the computing of a cloud probability that the pixel is a cloud pixel comprises:
   receiving a pixel-wise color of the pixel;
   determining a distance from the pixel to a pixel identified as a sun pixel;
   determining a distance from the pixel to a zenith in the sky in the image; or
   calculating an estimated motion vector of the pixel.

3. The method of claim 2, wherein the determination of a color of a pixel is determined according to a ratio of a red color channel to a blue color channel of the pixel.

4. The method of claim 3, wherein the ratio of a red color channel to a blue color channel is a simple ratio according to:

$$RBR = \frac{b}{r}$$

where RBR is the red to blue ratio, b is an intensity of a blue channel and r is an intensity of a red channel.

5. The method of claim 3, wherein the ratio of a red color channel to a blue color channel is a normalized ratio according to:

$$RBRn = \frac{b-r}{b+r}$$

where $RBR_n$ is the normalized red to blue ratio, b is an intensity of a blue channel and r is an intensity of a red channel.

6. The method of claim 1, wherein weighting each pixel further comprises:
   assigning a larger weight to a pixel determined to have a higher probability of representing a cloud and assigning a smaller weight to pixel determined to have a lower probability of representing a cloud.

7. The method of claim 6, wherein weighting each pixel further comprises:
   assigning a larger weight to a pixel located closer to sun pixels representing the sun in the sky image and assigning a smaller weight to a pixel located farther from sun pixels representing the sun in the sky image.

8. The method of claim 6, wherein the global motion vector is computed according to:

$$M\_x = \Sigma\{W(x,y).*F\_x(x,y)/\Sigma(W(x,y))\};$$

$$M\_y = \Sigma\{W(x,y).*F\_y(x,y)/\Sigma(W(x,y))\};$$

where W(x,y) is a weight assigned to a pixel having coordinates (x,y);
M_x is a global motion vector in an x direction; and
M_y is the global motion vector in a y direction.

9. The method of claim 8, wherein the weight W(x,y), is calculated by:

$$W(x,y) = h(P(x,y).*f(d(x,y)).*g(([F\_x(x,y) F\_y(x,y)][x-s\_x \; y-s\_y]')),$$

where h, f, and g are functions and
P(x,y) is a cloud probability for a pixel at (x,y);
d(x,y) is the distance to a set of sun pixels for a pixel at (x,y);
and
[F_x(x,y) F_y(x,y)][x-s_x y-s_y]' is an estimated motion vector for a pixel at (x,y) relative to the position of the set of sun pixels at (s_x,s_y), with F_x being the estimated motion vector coordinate in a x direction and F_y being a vector coordinate in a y direction.

10. A system for producing short-term, intra-hour cloud forecasts comprising:
a full sky camera;
a short-term cloud forecasting system configured to receive a plurality of images captured by the full sky camera, wherein the short-term cloud forecasting system comprises:
a cloud segmentation processor configured to receive image data from the plurality of images and generate a probability for each pixel in each image of the plurality of images that the pixel is representative of a cloud;
a cloud motion estimation processor configured to receive image data from the plurality of images and generate an estimated motion for each pixel in each image of the plurality of images, the cloud motion estimation processor configured to:
obtain a pixel-wise motion estimation field ($F\_x(x,y)$, $F\_y(x,y)$) for each pixel $(x,y)$ with $F\_x$ being the vector coordinate in a x direction and $F\_y$ being a vector coordinate in a y direction in one of the plurality of images; and
weight each pixel in the pixel-wise motion estimation field based on a likelihood that the pixel will represent a cloud which will occlude the sun in the short-term cloud forecast by measuring an angle discrepancy between an estimated motion of the pixel and a vector directed toward pixels in the sky images representing the sun and assigning a larger weight to pixels having an estimated motion with a smaller angle discrepancy to the sun and assigning a smaller weight to pixels having an estimated motion with a larger angle discrepancy relative to the sun; and
an uncertainty processor configured to produce at least one uncertainty index representing a likelihood that a pixel in an image of the plurality of images that is identified as a cloud will occlude a sun pixel of the image at a time in the future; and
wherein the short-term cloud forecasting system produces a forecast of cloud coverage based in part on the uncertainty index.

11. The system of claim 10, further comprising:
a sun occlusion prediction processor configured to receive data produced by one of the cloud segmentation processor and the cloud motion estimation processor to produce a likelihood that a pixel identified as a cloud in a sky image will correlate to a position in the image identified as containing a sun pixel.

12. The system of claim 11, wherein the sun occlusion prediction processor and the uncertainty processor are configured to produce at least one short-term cloud forecast.

13. The system of claim 12, wherein the at least one short-term cloud forecast is input to a control processor for a power grid.

14. The system of claim 10, wherein the computing of a cloud probability that the pixel is representative of a cloud comprises:
receiving a pixel-wise color of the pixel;
determining a distance from the pixel to a pixel identified as a sun pixel;
determining a distance from the pixel to a zenith in the sky in the image; or
calculating an estimated motion vector of the pixel.

15. The system of claim 10, wherein the uncertainty processor is configured to calculate a first uncertainty index based on a comparison of a cloud forecast for a current time $t_c$ with a ground true image captured at current time $t_c$.

16. The system of claim 15, wherein the uncertainty processor is configured to calculate a second uncertainty index based on a ratio of a number of pixel identified as cloud pixels in a portion of an image of the plurality of images to a total number of pixels in the portion of the image and a proximity of the portion of the image to a portion of the image identified as representing the sun.

* * * * *